(12) United States Patent
Sun et al.

(10) Patent No.: US 8,018,740 B2
(45) Date of Patent: Sep. 13, 2011

(54) LLC SOFT START BY OPERATION MODE SWITCHING

(75) Inventors: Bosheng Sun, Allen, TX (US); Yuwei Luo, Naperville, IL (US); Zhong Ye, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 67 days.

(21) Appl. No.: 12/683,743

(22) Filed: Jan. 7, 2010

(65) Prior Publication Data

US 2011/0164437 A1  Jul. 7, 2011

(51) Int. Cl.
*H02M 3/335* (2006.01)
*H02M 1/00* (2006.01)
(52) U.S. Cl. .............................. 363/16; 363/131; 363/49
(58) Field of Classification Search ..................... 363/16, 363/15, 140, 131, 49
See application file for complete search history.

(56) References Cited

U.S. PATENT DOCUMENTS

| 6,018,467 | A  | * | 1/2000  | Majid et al. ..................... 363/16 |
| 6,437,994 | B1 | * | 8/2002  | Blom et al. ...................... 363/16 |
| 7,848,117 | B2 | * | 12/2010 | Reinberger et al. ............. 363/16 |

* cited by examiner

*Primary Examiner* — Shawn Riley
(74) *Attorney, Agent, or Firm* — William B. Kempler; Wade J. Brady, III; Frederick J. Telecky, Jr.

(57) ABSTRACT

An embodiment of the invention provides a method of reducing surge current in an LLC converter. The LLC converter comprises a switching circuit having a first switch and a second switch, a resonant circuit, and a rectification circuit. During start up of the LLC converter, first and second signals having a fixed period and a variable duty cycle are applied to the first and second switches respectively. When a predetermined voltage on a load configured to be coupled to the rectification circuit is reached, the first and second signals are changed to signals having a variable period and a fixed duty cycle.

20 Claims, 3 Drawing Sheets

LLC SOFT START BY OPERATION MODE SWITCHING

BACKGROUND

DC (Direct Current)-to-DC converters may be found in many electronic devices. For example, DC-to-DC converters are often found in PDAs (Personal Digital Assistant), cellular phones and laptop computers. These electronic devices often contain several sub-circuits with different voltage level requirements from that supplied by a battery or an external supply. A DC-to-DC converter converts a source of direct current from one voltage level to another voltage level in order to meet the voltage levels required by sub-circuits.

One method of providing DC-to-DC conversion is through the use of a linear regulator. However, a linear regulator may dissipate too much heat for devices such as laptop computers and cellular phones.

DC-to-DC converters convert one DC voltage to another by storing the input energy temporarily and then releasing that energy to the output at a different voltage. The storage may be in either magnetic field storage components (e.g. inductors, transformers) or electric field storage components (i.e. capacitors) or a combination of both. This conversion method is more power efficient (often 75% to 98%) than a linear regulator, for example. This efficiency is beneficial to increasing the running time of battery operated devices.

Among the different DC-to-DC converter topologies, the LLC (Inductor Inductor Capacitor) converter has attracted substantial attention recently because of its high efficiency, smooth waveform and high power density. The high efficiency of the LLC converter is due to the use of zero voltage switching (ZVS). ZVS reduces switching loss which in turn improves the efficiency of the LLC converter.

An LLC converter operates in a resonant mode. During a resonant mode of operation, signals having a fixed duty cycle (approximately 50%) and a variable period drive powers switches. Power MOSFETs (Metal Oxide Semiconductor Field Effect Transistors) are typically used as power switches. The start up time of an LLC converter is quite critical. At start up, the output capacitors of an LLC converter are usually discharged. When an LLC converter starts to charge a discharged output capacitor, the instantaneous current or surge current drawn through a power MOSFET can be too great and cause the power MOSFET to stop functioning. Gradually charging output capacitors during start up of an LLC converter can prevent a power MOSFET from being rendered inoperable.

DETAILED DESCRIPTION

The drawings and description, in general, disclose embodiments of an LLC converter. In summary, the LLC converter includes a switching circuit, a resonant circuit, a rectification circuit, and a load. During start-up, especially when output capacitors are discharged, a surge current may be drawn through power switches in the switching circuit. To limit this surge current, the LLC converter starts in the PWM mode first. The signals driving the power switches are PWM (Pulse Width Modulated) signals having fixed periods and variable duty cycles. The use of PWM signals to drive the power switches gradually charge the output capacitors protecting the power switches against surge current.

When the output voltage is charged to a predetermined voltage which is close to the output voltage setting point (output capacitors are well charged at this time), the signals driving the switches in the switching circuit will change to resonant mode signals having variable periods and fixed duty cycles. As will be explained in more detail below, starting the LLC converter in the PWM mode and later changing to the resonant mode reduces the probability that electrical components in the LLC converter will be damaged.

Figure 1:
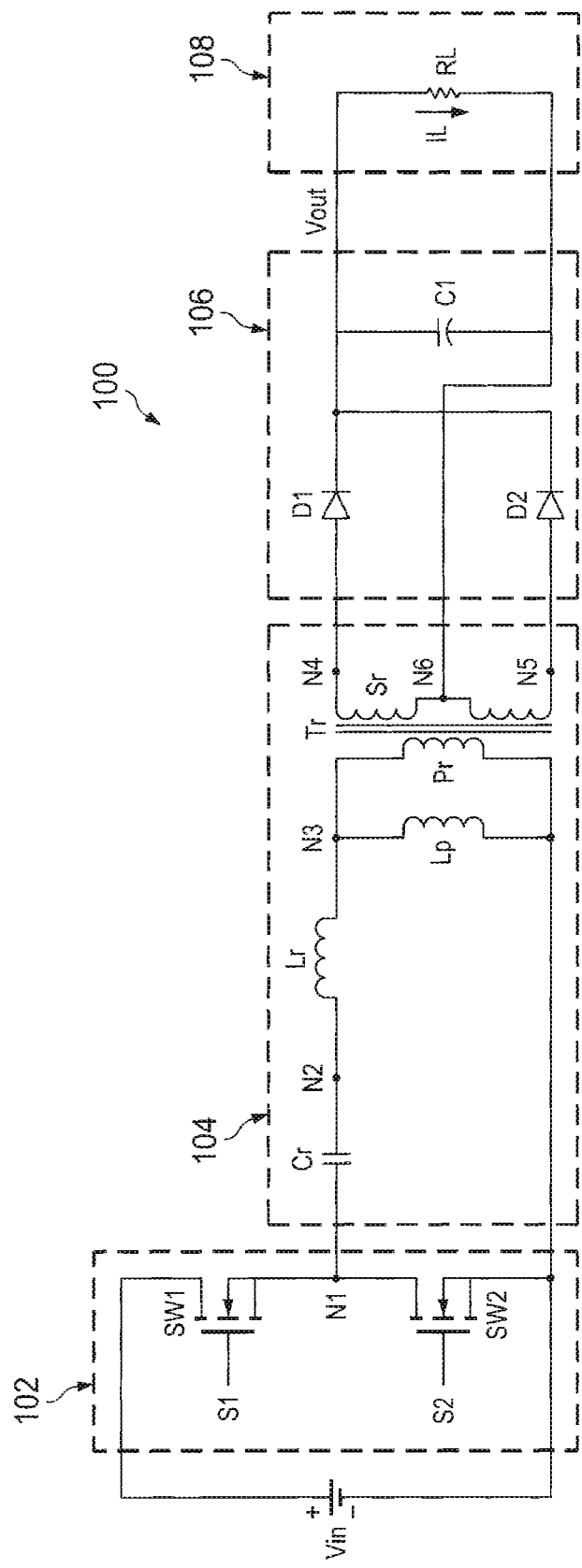
FIG. 1 is a schematic diagram of an embodiment of an LLC converter.

FIG. 1 is a schematic drawing showing an embodiment of an LLC converter 100. The LLC resonant circuit 104 in FIG. 1 includes a capacitor Cr, an inductor Lr, an inductor Lp, and a transformer Tr. The capacitor Cr, the inductor Lr and the inductor Lp are connected in series. The inductor Lr may be created by the leakage inductance of transformer Tr or a discrete inductor may be used as part of it. A combination of the magnetizing inductance Lm of transformer Tr and a discrete inductor placed in parallel with the primary winding Pr of the transformer Tr may be used to create inductor Lp.

One connection of capacitor Cr is connected to a connection of inductor Lr at node N2. Another connection of inductor Lr is connected to a first end of primary winding Pr of the transformer Tr and a first connection of inductor Lp at node N3. A second end of primary winding Pr of transformer Tr and a second connection of inductor Lp are connected to ground.

The rectification circuit 106 in this example is a full-wave center-tapped rectification circuit; however other types of rectification may be used such as full-wave non-center-tapped rectification (FIG. 6) or half-wave rectification. In the rectification circuit 106, a first connection of the secondary winding Sr of the transformer Tr is connected to the anode of diode D1 at node N4. A second connection of the secondary winding Sr of the transformer Tr is connected to the anode of diode D2 at node N5. The cathode of D1, the cathode of D2 and a first connection of capacitor C1 are connected at Vout. Vout is the output voltage produced by the LLC converter 100. A second connection of the capacitor C1 is connected to the center-tap on the secondary winding Sr of the transformer Tr at node N6. The resistor RL in the load 108 is connected at Vout and node N6. In this embodiment, a capacitor C1 is used as a low-pass filter. Other low-pass filters however may also be used, such as pi networks.

Figure 6:
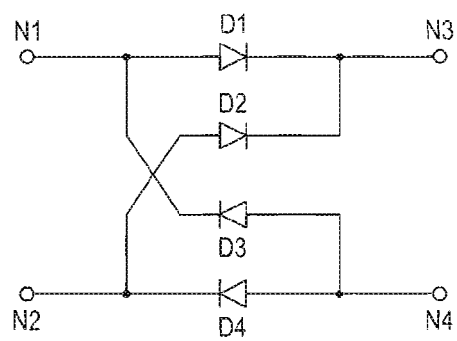
FIG. 6 is a schematic diagram of an embodiment of a full-wave non-center-tapped rectification circuit.

FIG. 6 illustrates an embodiment of a full-wave non-center-tapped rectification circuit. Because the embodiment shown in FIG. 6 is not centered-tapped, four diodes, D1, D2, D3, and D4, are necessary for full-wave rectification.

The switching circuit 102 in this example includes two switches SW1 and SW2. In this example, the switches SW1 and SW2 are NFETs. The drain of SW1 is connected to DC voltage Vin. The source of SW1 and the drain of SW2 are connected at node N1. Signals S1 and S2 drive switches SW1 and SW2. The source of SW2 is connected to ground. N1 is connected to the output of switching circuit 102.

Figure 2:
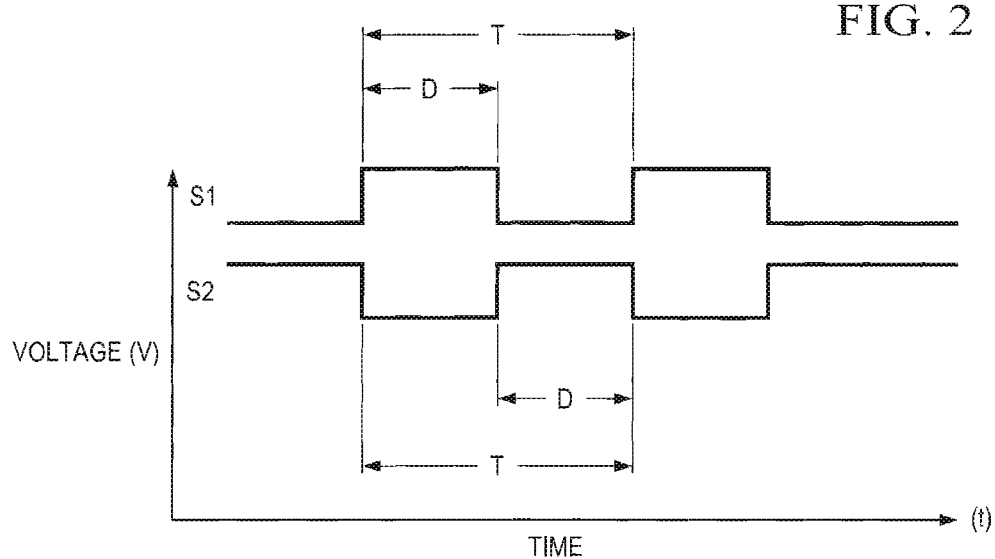
FIG. 2 is a timing diagram of voltages applied to switches SW1 and SW2 of an embodiment of the LLC converter of FIG. 1 in resonant mode.

The frequency Fs at which the switches SW1 and SW2 switch are controlled by signals S1 and S2 (shown in FIG. 2). The amount of time, DT, that switch SW1 is on during a period T is determined by a duty cycle D (shown in FIG. 2). The duty cycle D, in this example, has a value of approximately 0.5. The amount of time the switch SW2 is on is also D, but shifted by 180 degrees. Switches SW1 and SW2 may be implemented using transistors. In this embodiment of the invention, NFETs (N-type Field Effect Transistors) are used.

Figure 3:
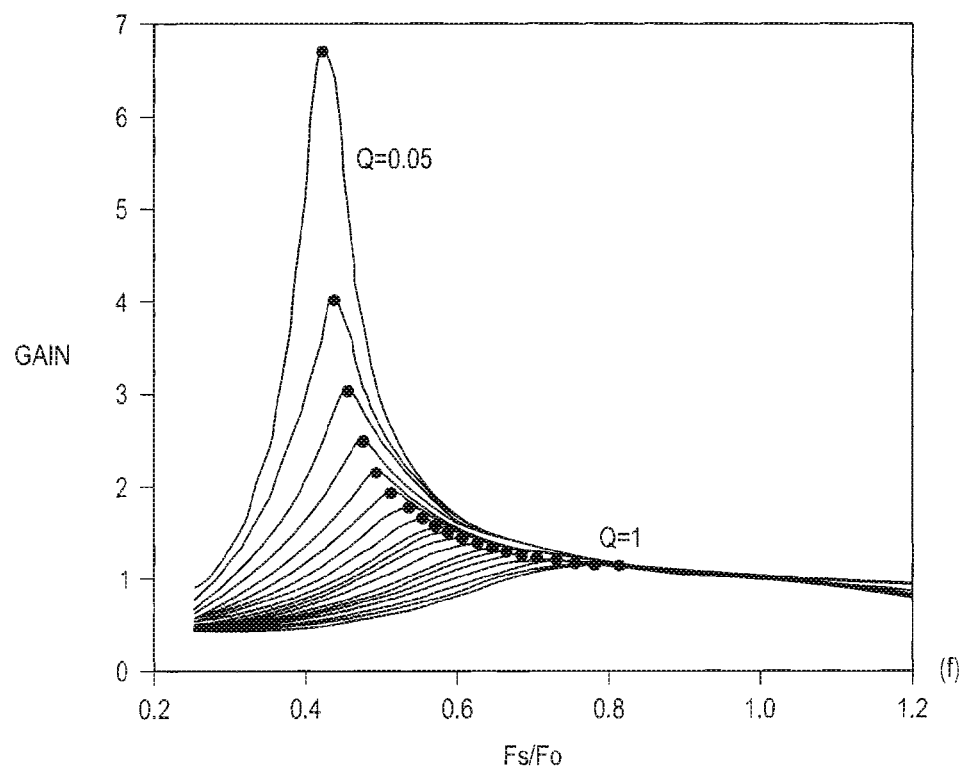
FIG. 3 is a plot of gain of an embodiment of an LLC converter as function of the switching frequency Fs.

FIG. 3 is a plot of gain of an embodiment of the LLC converter 100 as function of a resonant frequency Fo. When the LLC converter 100 is operated near the resonant frequency Fo, as is usually the case, all the load (Q) curves converge. The equation for Q in this example is shown in equation (1):

$$Q = ((Lr/Cr)^{1/2}/n^2 * RL) \quad (1)$$

The symbol "n" in equation (1) for Q represents the turns ratio of the transformer Tr. The convergence of the load (Q) curves indicates that a wide range of loads may be driven without significant change in the switching frequency Fs.

Before start up of an LLC converter, the output capacitor(s) C1 are usually discharged because they have drained. Because the output capacitor(s) C1 are usually discharged, the start up condition may be regarded as a temporary "short circuit." Due to the inherent fixed duty cycle (approximately 50%) characteristic of resonant mode control, surge current drawn through the switches SW1 and SW2 of the LLC converter 100 may be too large. As a result, the switches SW1 and SW2 may be damaged.

The conventional solution for the inrush current issue is to start the LLC converter with the maximum frequency, then gradually reduce the modulation frequency until the output voltage comes close to the setting point where a control loop closes and thereafter controls the voltage Vout. There are two problems with this solution: first, the maximum frequency allowable on the LLC converter is limited by the hardware; second, as shown in FIG. 3, the voltage modulation gain, instead of dropping to zero, will become flat when the frequency increases such that the voltage modulation gain is not low enough for a soft start. With these two problems, the output voltage will not ramp up from zero; rather, it will jump to some value and then start to ramp up from that value. The inrush current, as a consequence of this initial voltage jump, will cause higher stress on SW1 and SW2.

In order to avoid such surge current, current flow through the switches SW1 and SW2 needs to be progressively increased. In this embodiment of an LLC converter 100 in order to avoid surge current, the LLC converter 100 is started in the PWM mode first.

Figure 4:
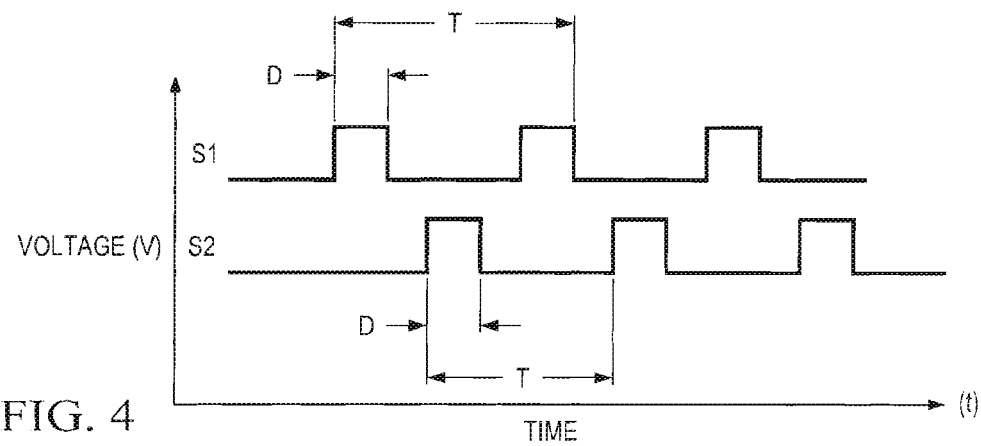
FIG. 4 is a timing diagram of voltages applied to switches SW1 and SW2 of an embodiment of the LLC converter of FIG. 1 in a PWM (Pulse Width Modulation) mode.

FIG. 4 illustrates an example of PWM signals for controlling surge current during start up. The PWM signals have a period T and a duty cycle D. In this example, the period T of signals S1 and S2 is fixed while the duty cycle D is variable. The duty cycle D may vary from 0 to nearly 50 percent. During start-up of an embodiment of the LLC converter 100, PWM signals S1 and S2 are used to slowly ramp up the voltage Vout on the load 108 from zero to a predetermined voltage near to the setting point of the voltage Vout. By varying the duty cycle, the amount of current drawn through switches SW1 and SW2 can be controlled so as to avoid destructive surge current. Although the ZVS (zero voltage switching) and the ZCS (zero current switching) conditions are not met during the PWM mode condition, the heat dissipated in switches SW1 and SW2 is below the device rating for this short duration. Hence, potential damage to the switches SW1 and SW2 may be avoided during a start up.

When the output voltage Vout is charged to a predetermined value, the LLC converter 100 in this example changes to the resonant mode. FIG. 2 illustrates an example of resonant mode signals S1 and S2 for controlling the voltage Vout thereafter. In this example, the period T of the square-wave control signals S1 and S2 is variable while the duty cycle D is fixed. In an embodiment of the invention, the duty cycle D of the control signals S1 and S2 is approximately 50 percent and signal S2 is approximately 180 degrees out of phase with control signal S1. The resonant mode control signals S1 and S2 continue to increase the voltage on Vout until a predetermined voltage is reached. After the predetermined voltage is reached on Vout, the resonant mode signals S1 and S2 regulate the voltage Vout by varying their frequency.

Figure 5:
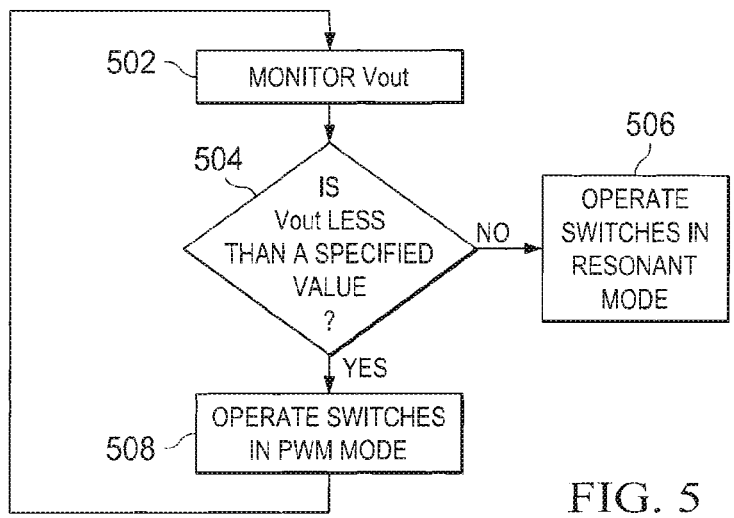
FIG. 5 is a flow chart illustrating an embodiment of a method of reducing surge current in an LLC converter during start up.

FIG. 5 is a flow chart illustrating an embodiment of a method of reducing surge current in an LLC converter 100 during start up. In box 502, the output voltage Vout is monitored. When the voltage Vout is less than a predetermined voltage, switches SW1 and SW2 are operated in the PWM mode. When the voltage Vout is equal to or greater than the predetermined voltage, switches SW1 and SW2 change to resonant mode.

The foregoing description has been presented for purposes of illustration and description. It is not intended to be exhaustive or to limit the invention to the precise form disclosed, and other modifications and variations may be possible in light of the above teachings. The embodiments were chosen and described in order to best explain the applicable principles and their practical application to thereby enable others skilled in the art to best utilize various embodiments and various modifications as are suited to the particular use contemplated. It is intended that the appended claims be construed to include other alternative embodiments except insofar as limited by the prior art.

What is claimed is:

1. An LLC converter comprising:
    a switching circuit having a first switch, a second switch, an input and an output, the input connected to a DC (Direct Current) voltage;
    a resonant circuit connected to the output of the switching circuit;
    a rectification circuit connected to the resonant circuit;
    wherein the first switch is controllable by a first PWM (Pulse Width Modulated) signal having a fixed period and variable duty cycle during start up of the LLC converter;
    wherein the second switch is controllable by a second PWM signal having a fixed period and variable duty cycle during start up of the LLC converter;
    wherein the first switch is controllable by a first resonant mode signal having a variable period and a fixed duty cycle when the voltage on a load configured to be coupled to the rectification circuit is equal to or greater than the predetermined first voltage;
    wherein the second switch is controllable by a second resonant mode signal having a variable period and a fixed duty cycle when the voltage on the load is equal to or greater than the predetermined first voltage.

2. The LLC converter of claim 1 wherein the fixed period of the first PWM signal is approximately equal to the fixed period of the second PWM signal;
    wherein the variable duty cycle of the first PWM signal has a value D;

wherein the variable duty cycle of the second PWM signal has a value D;
wherein the value of D is between 0 and 0.5.

3. The LLC converter of claim 1 wherein the first resonant mode signal has a duty cycle of approximately 50 percent;
wherein the second resonant mode signal has a duty cycle of approximately 50 percent;
wherein the second resonant mode signal is approximately 180 degrees out of phase with the first resonant mode signal.

4. The LLC converter of claim 1 wherein the resonant circuit comprises:
a first capacitor;
a first inductor connected to the first capacitor;
a second inductor connected to the first inductor;
a transformer having a primary winding and a secondary winding;
wherein the primary winding is connected to the first and second inductors;
wherein the primary winding and the second inductor are connected in parallel.

5. The LLC converter of claim 4 wherein the rectification circuit comprises:
a first diode having an anode and a cathode, the anode of the first diode connected to a first connection of the secondary winding;
a second diode having an anode and a cathode, the anode of the second diode connected to a second connection of the secondary winding;
a second capacitor having a first and second connection, the first connection of the second capacitor connected to the cathode of the first diode and to the cathode of the second diode, the second connection of the second capacitor connected to a center tap of the secondary winding.

6. The LLC converter of claim 4 wherein the rectification circuit comprises:
a first diode having an anode and a cathode, the anode of the first diode connected to a first connection of the secondary winding;
a second diode having an anode and a cathode, the cathode of the second diode connected to the first connection of the secondary winding;
a third diode having an anode and a cathode, the anode of the third diode connected to a second connection of the secondary winding and the cathode of the third diode connected to the cathode of the first diode;
a fourth diode having an anode and a cathode, the anode of the fourth diode connected to the anode of the second diode and the cathode of the fourth diode connected to a second connection of the secondary winding;
a second capacitor having a first connection and a second connection, the first connection of the second capacitor connected to the cathode of the first diode and the second connection of the second capacitor connected to the anode of the second diode and to the anode of the fourth diode.

7. The LLC converter of claim 1 wherein the first switch and the second switch are transistors.

8. The LLC converter of claim 1 wherein the first switch and the second switch are NFETs (N-type Field Effect Transistors).

9. A method of reducing surge current in an LLC converter, the method comprising:
applying a first PWM signal having a fixed period and variable duty cycle to a first switch during start up of the LLC converter;
applying a second PWM signal having a fixed period and variable duty cycle to a second switch during start up of the LLC converter;
applying a first resonant mode signal having a variable period and a fixed duty cycle to the first switch when the voltage on a load configured to be coupled to the rectification circuit is equal to or above the predetermined first voltage;
applying a second resonant mode signal having a variable period and a fixed duty cycle to the second switch when the voltage on the load connected to the converter is equal to or above the predetermined first voltage.

10. The method of claim 9 wherein the first PWM signal, the second PWM signal, the first resonant mode signal and the second resonant mode signal are square waves.

11. The method of claim 10 wherein the fixed period of the first PWM signal is approximately equal to the fixed period of the second PWM signal;
wherein the variable duty cycle of the first PWM signal has a value D;
wherein the variable duty cycle of the second PWM signal has a value D;
wherein the value of D is between 0 and 0.5.

12. The method of claim 10 wherein the first resonant mode signal has a duty cycle of approximately 50 percent;
wherein the second resonant mode signal has a duty cycle of approximately 50 percent;
wherein the second resonant mode signal is approximately 180 degrees out of phase with the first resonant mode signal.

13. The method of claim 10 wherein the first switch and the second switch are transistors.

14. The method of claim 10 wherein the first switch and the second switch are NFETs (N-type Field Effect Transistors).

15. An apparatus comprising at least an LLC converter wherein the LLC converter comprises:
a switching circuit having an a first switch, a second switch, an input and an output, the input connected to a DC voltage;
a resonant circuit connected to the output of the switching circuit;
a rectification circuit connected to the resonant circuit;
wherein the first switch is controllable by a first PWM (Pulse Width Modulated) signal having a fixed period and variable duty cycle during start up of the LLC converter;
wherein the second switch is controllable by a second PWM signal having a fixed period and variable duty cycle during start up of the LLC converter;
wherein the first switch is controllable by a first resonant mode signal having a variable period and a fixed duty cycle when the voltage on a load configured to be coupled to the rectification circuit is equal to or greater than the predetermined first voltage;
wherein the second switch is controllable by a second resonant mode signal having a variable period and a fixed duty cycle when the voltage on the load is equal to or greater than the predetermined first voltage.

16. The apparatus of claim 15 wherein the first switch and the second switch are transistors.

17. The apparatus of claim 15 wherein the first switch and the second switch are NFETs (N-type Field Effect Transistors).

18. The apparatus of claim 15 wherein the fixed period of the first PWM signal is approximately equal to the fixed period of the second PWM signal;

wherein the variable duty cycle of the first PWM signal has a value D;

wherein the variable duty cycle of the second PWM signal has a value D;

wherein the value of D is between 0 and 0.5.

19. The apparatus of claim 15 wherein the first resonant mode signal has a duty cycle of approximately 50 percent;

wherein the second resonant mode signal has a duty cycle of approximately 50 percent;

wherein the second resonant mode signal is approximately 180 degrees out of phase with the first resonant mode signal.

20. The apparatus of claim 15 wherein the apparatus is selected from the group consisting of PDAs (Personal Digital Assistant), cellular telephones and laptop computers.

* * * * *